(12) United States Patent
Hofmann et al.

(10) Patent No.: US 12,260,252 B2
(45) Date of Patent: Mar. 25, 2025

(54) SAFETY DEVICE AND SAFETY METHOD FOR MONITORING A MACHINE

(71) Applicant: SICK AG, Waldkirch (DE)

(72) Inventors: Christoph Hofmann, Waldkirch (DE); Thomas Neumann, Waldkirch (DE); Sanketh Ramachandra, Waldkirch (DE)

(73) Assignee: SICK AG, Waldkirch (DE)

( * ) Notice: Subject to any disclaimer, the term of this patent is extended or adjusted under 35 U.S.C. 154(b) by 579 days.

(21) Appl. No.: 17/564,342

(22) Filed: Dec. 29, 2021

(65) Prior Publication Data

US 2022/0244995 A1 Aug. 4, 2022

(30) Foreign Application Priority Data

Feb. 4, 2021 (EP) .................... 21155211

(51) Int. Cl.
*G06F 3/00* (2006.01)
*G06F 9/50* (2006.01)
*G06F 11/34* (2006.01)

(52) U.S. Cl.
CPC ........ *G06F 9/5027* (2013.01); *G06F 11/3495* (2013.01)

(58) Field of Classification Search
CPC ...................................................... G06F 9/48
See application file for complete search history.

(56) References Cited

U.S. PATENT DOCUMENTS

| 8,276,123 B1* | 9/2012 | Deng | G06F 11/368 717/124 |
|---|---|---|---|
| 11,030,318 B1* | 6/2021 | Shavro | G06F 21/577 |
| 11,036,836 B2* | 6/2021 | Touboul | H04L 63/1441 |
| 2004/0148513 A1* | 7/2004 | Scott | G05B 19/042 726/26 |

(Continued)

FOREIGN PATENT DOCUMENTS

| CH | 588127 A5 | 3/1977 |
|---|---|---|
| DE | 4340756 A1 | 6/1994 |

(Continued)

OTHER PUBLICATIONS

Dieter Etz, Flexible Safety Systems for Smart Manufacturing. (Year: 2000).*

(Continued)

*Primary Examiner* — Lechi Truong
(74) *Attorney, Agent, or Firm* — Nath, Goldberg & Meyer; Jerald L. Meyer

(57) ABSTRACT

A safety device is provided for monitoring at least one machine that has at least one sensor for generating sensor data on the machine and a processing unit for the sensor data that is connected at least indirectly to the sensor and to the machine and that is configured as a runtime environment having at least one computing node and to allow at least one logic unit to run on the computing node, wherein at least one logic unit comprises a safety functional unit for a safety relevant evaluation of the sensor data to output in the case of a safety relevant event a safety signal to the machine for triggering a safety response, In this respect, the processing unit is furthermore configured to generate and resolve logic units and/or to assign them to a computing node.

21 Claims, 3 Drawing Sheets

(56) References Cited

U.S. PATENT DOCUMENTS

Figure 1:
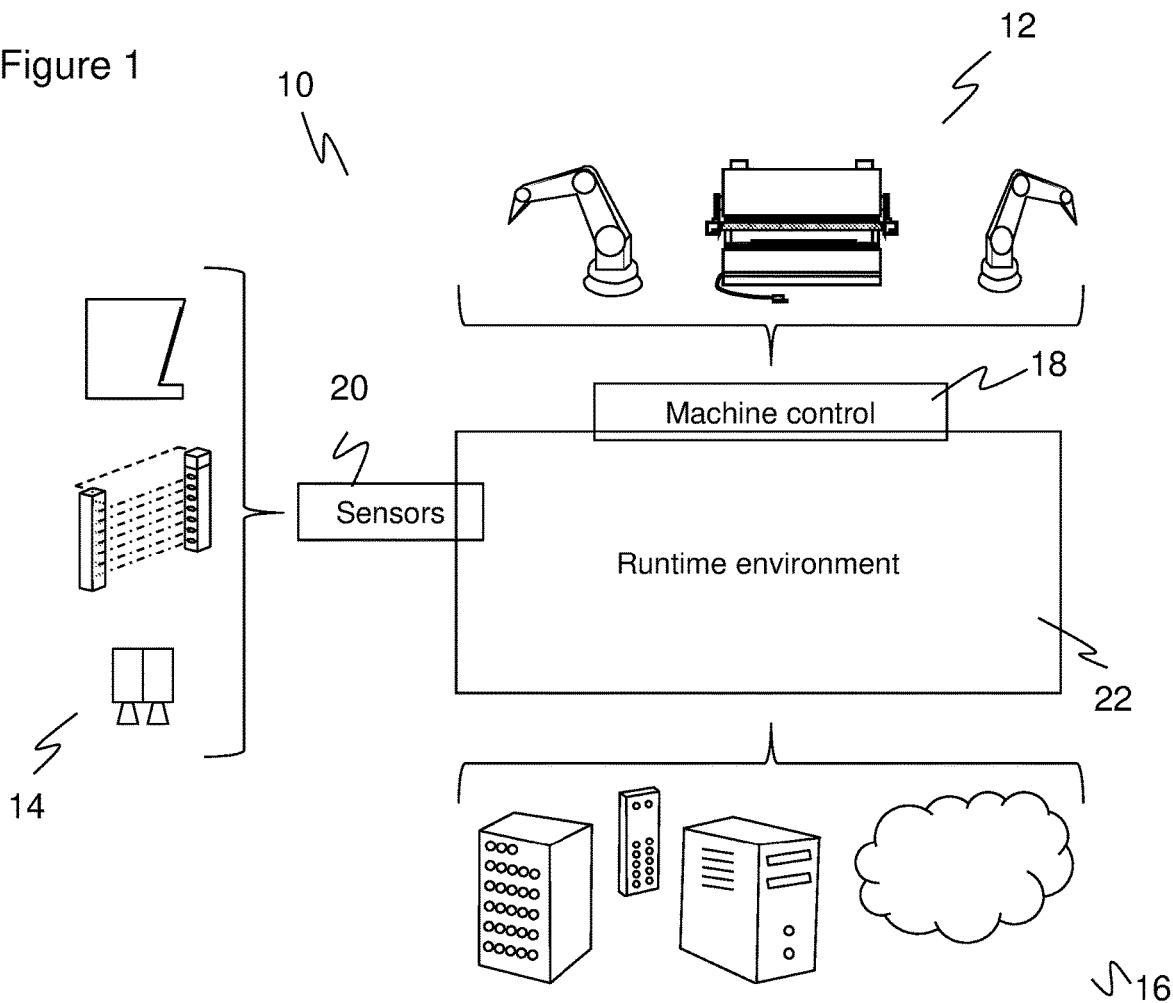

| | | | | |
|---|---|---|---|---|
| 2005/0273861 | A1* | 12/2005 | Chess | G06F 21/54 |
| | | | | 726/25 |
| 2007/0050777 | A1* | 3/2007 | Hutchinson | G06F 11/0781 |
| | | | | 718/104 |
| 2008/0209211 | A1* | 8/2008 | Grgic | G05B 9/03 |
| | | | | 713/166 |
| 2010/0306544 | A1* | 12/2010 | Lionetti | H04L 9/083 |
| | | | | 380/278 |
| 2015/0105873 | A1* | 4/2015 | Haberer | G01S 17/88 |
| | | | | 700/79 |
| 2016/0088019 | A1* | 3/2016 | Li | H04L 63/20 |
| | | | | 726/1 |
| 2016/0320759 | A1* | 11/2016 | Macha | G06F 11/2025 |
| 2017/0249202 | A1* | 8/2017 | Nguyen | G06F 11/079 |
| 2017/0329966 | A1* | 11/2017 | Koganti | G06F 21/56 |
| 2019/0182267 | A1* | 6/2019 | Aher | H04W 4/48 |
| 2019/0362080 | A1* | 11/2019 | Achillopoulos | G06F 21/72 |
| 2019/0392139 | A1* | 12/2019 | Nikolai | G06F 21/552 |
| 2020/0061811 | A1 | 2/2020 | Iqbal et al. | |
| 2020/0272123 | A1* | 8/2020 | Denenberg | B25J 9/1697 |
| 2020/0344602 | A1* | 10/2020 | Li | H04L 67/125 |
| 2021/0192027 | A1* | 6/2021 | Malton | G06F 21/31 |
| 2021/0282117 | A1* | 9/2021 | Bivans | H04L 9/0891 |
| 2021/0397693 | A1* | 12/2021 | Weigelt | G06F 3/044 |
| 2022/0075884 | A1* | 3/2022 | Hildreth | G06F 21/554 |
| 2022/0169140 | A1* | 6/2022 | Yang | B60L 53/66 |
| 2022/0391545 | A1* | 12/2022 | Stewart | G06F 3/0623 |

FOREIGN PATENT DOCUMENTS

| | | |
|---|---|---|
| EP | 2053538 A1 | 4/2009 |
| EP | 3179278 A1 | 9/2018 |
| EP | 3709106 A1 | 9/2020 |

OTHER PUBLICATIONS

Xiangqian Chen, Sensor Network Security: A Survey (Year: 2009).*
European Search Report dated Aug. 10, 2021 corresponding to application No. 21155211.2-1009.

* cited by examiner

SAFETY DEVICE AND SAFETY METHOD FOR MONITORING A MACHINE

The invention relates to a safety device for monitoring at least one machine and to a safety method for monitoring a.

Safety engineering deals with personal protection and with the avoidance of accidents with machines. A safety device of the category uses one or more sensors to monitor a machine or its environment and to switch it to a safe state in good time when there is impending danger. A typical conventional safety engineering solution monitors a protected field that may not be entered by operators during the operation of the machine by the at least one sensor, for instance by means of a laser scanner. If the sensor recognizes an unauthorized intrusion into the protected field, for instance a leg of an operator, it triggers an emergency stop of the machine. There are alternative safety concepts such as so-called speed and separation monitoring in which the distances and speeds of the detected objects in the environment are evaluated and a response is made in a hazardous situation.

Particular reliability is required in safety engineering and high safety demands therefore have to be satisfied, for example the standard EN13849 for safety of machinery and the machinery standard EN1496 for electrosensitive protective equipment (ESPE). Some typical measures for this purpose are a secure electronic evaluation by redundant, diverse electronics or different functional monitoring processes, for instance the monitoring of the contamination of optical components, including a front screen. Somewhat more generally, well-defined error control measures have to be demonstrated so that possible safety-critical errors along the signal chain from the sensor via the evaluation up to the initiation of the safety engineering response can be avoided or controlled.

Due to the high demands on the hardware and software in safety engineering, primarily monolithic architectures have been used to date using specifically developed hardware that provides for redundancies and a functional monitoring by multi-channel capability and test possibilities. Proof of correct algorithms is accordingly documented, for instance in accordance with IEC TS 62998, IEC-61508-3, and the development process of the software is subject to permanent strict tests and checks. An example for this is a safety laser scanner such as is known, for example, for the first time from DE 43 40 756 A1 and whose main features have been used in a widespread manner up to now. The entire evaluation function, including the time of flight measurement for the distance determination and the object detection in configured protected fields, is integrated there. The result is a fully evaluated binary securing signal at a two-channel output (OSSD, output signal switching device) of the laser scanner that stops the machine in the event of an intrusion into the protected field. Even though this concept has proven itself, it remains inflexible since changes are practically only possible by a new development of a follow-up model of the laser scanner.

In some conventional safety applications, at least some of the evaluation is outsourced from the sensor into a programmable controller (PLC, programmable logic controller). However, particular safety controllers and the like are required for this purpose that themselves have multi-channel structures for error avoidance and error detection. They are therefore expensive and provide comparatively little memory capacity and processing capacity that are, for example, completely overwhelmed by 3D image processing.

The use of standard controllers would admittedly be conceivable in principle while being embedded in the required functional monitoring processes, but this is hardly used in an industrial environment today since it requires more complex architectures and expert knowledge. In another respect, standard controllers or PLCs can only be programmed with certain languages with in part a very limited language area. Even relatively simple functional blocks require substantial development effort and runtime resources so that their implementation in a standard controller can hardly be realized with somewhat more complex applications, particularly under safety measures such as redundancies.

EP 3 709 106 A1 combines a safety controller with a standard controller in a safety system. More complex calculations remain with the standard controller and their results are validated by the safety controller. The safety controller, however, makes use of existing safe data of a safe sensor for this purpose, which restricts the possible application scenarios and additionally in turn requires expert knowledge to acquire and thus suitably validate suitable safe data. In addition, the hardware structure is still fixedly predefined and the application is specifically fixedly implemented thereon.

It would be desirable in a number of cases to combine the safety monitoring with automation work. Not only accidents are thus avoided, but the actual task of the machine is also likewise supported in an automated manner. Completely different systems and sensors have mostly been used for this purpose to date, however. This is inter alia due to the fact that a safety sensor is much too expensive for automation work and conversely the complexity of a safety sensor should not be overloaded with further functions. EP 2 053 538 B1 permits the definition of separate safety and automation regions for a 3D camera. This is, however, only a first step since admittedly the same sensor is still used for the two worlds of safety and automation, but these tasks are then again clearly separated from one another spatially and at the implementation side. IEC 62998 permits the coexistence of safety and automation data, but does not make any specific implementation proposals as a standard.

There have long been a very large number of more flexible architectures outside safety engineering. The monolithic approach has there long given way in a number of steps to more modern concepts. The earlier traditional distribution (deployment) with fixed hardware on which an operating system coordinates the individual applications admittedly is still justified in stand-alone devices, but has no longer been satisfactory for a long time in a networked world. The basic idea in the further development was the inclusion of additional layers that are further and further abstracted from the specific hardware.

The so-called virtual machines where the additional layer is called a hypervisor or a virtual machine monitor are a first step. Such approaches have also been tentatively pursued in safety engineering in the meantime. EP 3 179 279 B1, for instance, provides a protected environment in a safety sensor to permit the user to allow his own program modules to run on the safety sensor. Such program modules are then, however, carefully separated from the safety functionality and do not contribute anything to it.

A further abstraction is based on so-called containers (container visualization, containerization). A container is so-to-say a small virtual capsule for a software application that provides a complete environment for its running including memory areas, libraries, and the like. The associated abstracting layer or runtime environment is called a container runtime. The software application can thus be developed independently of the hardware, that can be practically any hardware, on which it later runs. Containers are frequently implemented with the aid of Docker.

In a modern IoT (internet of things, industrial internet of things) technology, a plurality of containers having the most varied software applications are combined. These containers have to be suitably coordinated, which is known as orchestration in this connection, and for which a so-called orchestration layer is added as a further abstraction. Docker swarm as an extension of Docker as well as Kubernetes, rkt, or LXC are inter alia known for the container orchestration.

The use of such modern, abstracting architectures in safety engineering has previously failed due to the high hurdles of safety standards and the correspondingly conservative approach in the application field of functional safety. Container technologies are absolutely generally pursued in the industrial environment and there are for plans, for example in the automotive industry, for the use of Kubernetes architectures; and the German air force is also pursuing such approaches. However, none of this is directed to functional safety and so does not solve the problems named.

A high availability is admittedly also desired in a customary IoT world, but this form of fail-safety has long by no means been comparable to what the safety standards require. Edge or cloud applications have therefore been inconceivable for safety satisfying the standards for a safety engineer to date. It contradicts the widespread concept of providing reproducible conditions and of preparing for all the possibilities of a malfunction that are imaginable under these conditions. An extensive abstraction or visualization provides additional uncertainty that has previously appeared incompatible with the safety demands.

It is therefore the object of the invention to increase the overall flexibility of safety applications.

This object is satisfied by a safety device and by a safety method for monitoring a machine in accordance with the respective independent claim. The terms safety or safe are to be understood in the sense of a safety standard within the framework of this description. The safety device accordingly satisfies a safety standard, for example for machine safety, electrosensitive protective equipment, or the avoidance of accidents in personal protection, or it is able, worded a little differently again, to observe safety levels defined by standards; errors up to a safety level specified in the safety standard are consequently respectively controlled. Some examples of such safety standards have been named in the introduction, where the safety levels are called, for example, protective classes or performance levels. The invention is not restricted to a specific one of these safety standards that may vary in their specific numbering and wording regionally and over time, but not in their basic principles for providing safety.

"At least one" unit or other component of the safety device is repeatedly spoken of in this description. This means that there may be one or more of these units and a clear distinction is not always made linguistically. If a unit is introduced at any point and if a corresponding unit is again configured at a later point, it may be either the same unit or a further unit of the same type. If at least one unit has specific properties, this applies to a single unit, to a plurality of units, or to all the units of the respective type.

The monitored machine or the machine to be secured should initially be understood generally; it is, for example, a processing machine, a production line, a sorting station, a process unit, a robot, or a vehicle in a large number of variations such as rail-bound or not, guided or driverless, and the like. At least one sensor delivers sensor data on the machine, i.e. data on the machine itself, on what it interacts with, or on its environment. The sensor data are at least partially safety relevant; additional non-safety relevant sensor data for automation functions or comfort functions are conceivable. The sensors can, but do not have to be, safety sensors; safety can only be ensured at a later position.

A processing unit acts as the runtime environment. The processing unit is thus the structural element; the runtime environment is its function. The processing unit is at least indirectly connected to the sensor and to the machine. It accordingly has access to the sensor data for its processing, possibly indirectly via interposed further units, and can communicate with the machine and can in particular influence it, preferably via a machine controller of the machine. The processing unit or runtime environment as an umbrella term designates the hardware and software with which a decision is made on the requirement and preferably also on the type of a safety relevant response of the machine with reference to the sensor data.

The processing unit comprises at least one computing node. It is a digital computing device or a hardware node or a part thereof that provides processing and memory capacities for executing a software functional block. However, not every computing node necessarily has to be a separate hardware module; a plurality of computing nodes can, for example, be implemented on the same device by using multiprocessors and conversely a computing node can also bundle different hardware resources.

At least one logic unit runs on the computing node or on one of the computing nodes in the operation of the safety device. The logic unit accordingly generally designates a software functional block. In accordance with the invention, at least one logic unit is configured as a safety functional unit that performs a safety relevant evaluation of the sensor data and thus determines whether there is a hazard, that is whether a safety relevant event has been recognized, for personal protection or for accident prevention. This is the case, for example, in the detection of a person who is too close to the machine or in a protected field, but also on a defect of the sensor or of the processing unit that is safety relevant and that no longer ensures the safe function.

In the case of a safety relevant event, a safety signal is output to the machine to trigger a safety relevant response there by which the machine is switched to a safe state that eliminates the hazard or at least reduces it to an acceptable level. Depending on the situation, the response comprises, for example, a slowing down, a special work mode of the machine, an evasion, or a stopping.

The invention starts from the basic idea that the processing unit or runtime environment is adapted to a given hardware landscape. The provided hardware is divided into computing nodes to which logic units are assigned and the runtime environment takes care of the running. This is preferably not only done once, but also dynamically during operation. The processing unit is able to generate and resolve logic units and to assign them to a computing node or to displace them between computing nodes. This very explicitly also relates to the safety relevant logic units, that is to safety functional units, and to the diagnosis units still to be presented. The link between the hardware and the evaluation is thus fluid while maintaining functional safety. The safety device thus preferably receives an additional abstraction layer for coordinating or orchestrating applications, in particular containers (orchestration layer).

This is radically different than conventionally in safety engineering. A fixed hardware structure is predefined there, typically developed just for this safety function, and the software functionality is developed for just this hardware structure, and is fixedly implemented and tested there. A subsequent change of the software deployment is precluded and this applies even more so by a change of the underlying hardware. Such modifications conventionally require at least a complex conversion by a safety expert, as a rule a complete new development, An effect of the typical conservative approach in industry and above all in safety engineering, is that even firmware updates or software updates of sensors and controllers are at the utmost carried out in long cycles and typically not at all.

The invention has the advantage that a safety architecture is presented for the first time that coordinates or orchestrates safety relevant applications in an industrial environment (industrial internet of things, IIoT). The safety standard ISO 13849 generally permits the use of standard controllers for safety applications, but the additional measured required for this can only be managed with the considerations presented here. A desired safety level can be ensured and even increased by the invention. The hardware development and software development is relieved since the redundancy and diversity can be established very easily in accordance with the invention and this replaces many a functional test that has been previously individually developed or a multi-channel capability and a diversity laboriously achieved. In addition, the robustness is substantially increased because logic units can be implemented on different hardware and can be displaced between computing nodes. Finally, the invention provides completely new possibilities of implementing traditional safety in the sense of personal protection (safety) together with data security and data integrity (cyber security).

At least one logic unit is preferably configured as a diagnostic unit ("watchdog") that tests or monitors a safety functional unit. Diagnostic units form the safety relevant logic units with the safety functional units. A diagnostic unit monitors or tests a safety functional unit with reference to its evaluation result, in particular an evaluation result that is generated in response to specific artificial test sensor data. The diagnostic unit does not require any special knowledge how or with which algorithm a safety functional unit works, but only an expectation for evaluation results on a correct working. Diagnostic units and safety functional units are preferably only associated with one another one-to-one; a safety functional unit can also be monitored by a plurality of diagnostic units that are the same as or different than one another or one diagnostic unit can be responsible for a plurality of safety functional units that are the same or different from one another. It is also conceivable that the same logic unit comprises the functionality of both a safety functional unit and a diagnostic unit, in particular when two copies of such a logic unit work redundantly and mutually check one another with reference to the evaluation results.

The runtime environment preferably has at least one master unit that communicates with the computing nodes and coordinates them. The master unit can also have a plurality of sub-units for redundancy and/or for distributed responsibility or can be assisted by node manager units of the computing nodes and can be implemented together with logic units on a separate computing node or on a computing node.

The runtime environment is preferably configured to check whether a logic unit is still working. This check is substantially limited to obtaining a sign of life whether a logic unit is still working at all and manages with the assigned resources. This should not be confused with the functionality of a diagnostic unit that uncovers very specific defects in a specific safety functionality unit.

The runtime environment is preferably configured to change the resources assigned to a logic unit. It can assist the logic unit for a faster processing, but can also release resources for other logic units. Particular possibilities to provide more resources are the displacement of a logic unit to another computing node or the generation of another computing node or the generation of a further instance or copy of the logic unit, with a logic unit for the latter preferably being configured for a performance that can be parallelized.

The runtime environment preferably holds configuration information or a configuration file on the logic units stored. A record is kept on or specified on the logic units present with reference to the configuration information as to which logic units should be executed in which time routine and with which resources and as to how they are possibly in relation with one another so that a diagnostic unit can watch over a safety functional unit in the intended manner.

The configuration information is particularly preferably secured against manipulation by means of signatures or blockchain datasets. Such a manipulation can be intentional or unintentional; the configuration of the logic units should in any case not be changed in an unnoticed manner in a safety application.

The at least one computing node preferably has a node manager unit for communication with other computing nodes and with the runtime environment. This node manager unit is responsible for the management and coordinates of the associated computing node, in particular the logic units of this computing node, and for the interaction with the other computing nodes and with the master unit. It can also take over work of the master unit in practically any desired deployment.

The at least one computing node preferably has at least one sub-node and the logic units are associated with a sub-node. The computing nodes are thus structured in themselves a further time to combine logic units in a sub-node.

The at least one logic unit is preferably implemented as a container. The logic units are then encapsulated or containerized and are runnable on practically any desired hardware. The otherwise customary relationship between the safety function and its implementation on fixed hardware is broken up so that the flexibility and process stability are very considerably increased. The runtime environment coordinates or orchestrates the containers having the logic units located therein among one another. There are at least two abstraction layers, on the one hand a respective container layer (container runtime) and on the other hand an orchestration layer of the runtime environment disposed thereabove.

The runtime environment is preferably implemented on at least one sensor, a programmable logic controller, a machine controller, a processor device in a local network, an edge device and/or in a cloud. The underlying hardware landscape can in other works practically be as desired, which is a very big advantage of the approach in accordance with the invention. The runtime environment works abstractly with computing nodes; the underlying hardware can have a very heterogeneous composition. Edge or cloud architectures in particular also become accessible to safety engineering without having to dispense with the familiar evaluation hardware of (safe) sensors or controllers in so doing.

The runtime environment is preferably configured to integrate and/or to preclude computing nodes. The hardware environment may thus vary; the runtime environment is able to deal with this and to form new or adapted computing nodes. It is accordingly possible to connect new hardware or to replace hardware, in particular for replacement on a (partial) failure and for upgrading and for providing additional computing and memory resources. The logic units can continue to work on the computing nodes abstracted from the runtime environment despite a possible, also brutally changed hardware configuration.

The runtime environment is preferably configured to dynamically generate and resolve a safety relevant logic unit on the runtime and/or to assign it to a computing node. Safety functional units and diagnostic units are safety relevant logic units. Conventionally, all the safety functions are implemented fixedly and unchangeably on dedicated hardware. A change, where producible at all without conversion or a new development, would be considered as completely incompatible with the underlying safety concept. This already applies to a one-time implementation and in particular to dynamic changes to the runtime. In contrast, everything is always done so that the safety function finds a well-defined and unchanged environment at the start and over the total operating time with an absolutely large effort and numerous complex individual measures.

A safety functional unit is advantageously configured to dynamically determine a required or achievable safety level for the safety device. The determination of a required safety level can take place as part of a behavior driven risk assessment (BDRA). In this respect, a safety device is no longer assigned a fixed safety level, but a decision on which safety level is required at just that time is made situationally. The safety functional unit decides this using the sensor data and optionally further data, for instance a work mode communicated by a machine control. Conversely, it is also conceivable that the safety functional unit determines which safety level the safety device makes available in its current configuration. The naturally compels a safety relevant response, that is, however, possibly milder than an immediate emergency stop, if this achievable safety level turns out to be lower than the required safety level. Specific work modes such as a slower robot movement or a silent running of a vehicle are still permitted with the achievable safety level so that at least a certain productivity can still be maintained.

The runtime environment is preferably configured to dynamically adapt the safety level of the safety device by at least one of the measures changing test cycles, changing redundancy, and/or changing diversity. The newly achieved safety level can be predefined from external or can have been determined dynamically as described in the previous paragraph. There are different adjustable screws for adapting the safety level, namely first the length of test cycles after which tests are repeated or somewhat more generally the points in time at which a diagnostic unit tests or monitors a safety functional unit; second the multiplicity of a redundancy or the number of the logic units responsible for the execution of a safety function; and/or third the diversity that arises due to the implementation of a logic unit responsible for a safety function on the same or different sub-nodes or computing nodes. The safety level is changed by means of at least one of these adjustable screws. A further conceivable adjustable screw replaces logic modules responsible for specific work, for instance a simple safety functional unit or diagnostic unit for a complex safety functional unit or diagnostic unit or vice versa.

Test cycles can be short or long. This is selectively specified by times, for instance a text every x milliseconds, or based on the measurement cycles of the sensor or the evaluation cycles of the sensor data. m test cycles for n measurement or evaluation cycles can be fixed and the ratio m:n of typically m>n to n=n=1 fixes the desired frequency. A so-called test before demand is also conceivable that runs less in regular cycles, but rather more event based.

Redundancy does not have to be provided at all or two or more copies or instances of safety relevant logic units are generated. This then effectively produces a corresponding multi-channel capability of the evaluation.

Diversity is produced when redundant logic units or also only a safety functional unit and its associated diagnostic unit are implemented on different sub-nodes or preferably on different computing nodes. In this respect, the diversity is the greater, the more sub-nodes or computing nodes the logic units are deployed on.

This is a special form of diversity that is based above all on the hardware. To be able to run on the different hardware at all, the software naturally also differs, but these differences are abstracted or encapsulated from the actual logic unit in accordance with the invention and are supported by the runtime environment and in particular its container layer or orchestration layer. Such software differences can nevertheless also absolutely contribute to a useful diversity. Even more diversity could furthermore be provided by different implementations or even algorithms within the logic units. This can admittedly be advantageously combined with the invention, but the runtime environment cannot perform it itself; this is the responsibility of the individual programming of logic units. The use of different compilers and of a similar variation that can be automated could provide certain additional diversity.

The runtime environment is preferably configured to set the safety level of the safety device to:
  low: a safety function is only implemented simply in a safety relevant logic unit; a diagnosis only takes place at every nth sensor cycle or before demand;
  medium: a safety function is only implemented simply in a safety relevant logic unit; a diagnosis takes place in short cycles, in particular at every sensor cycle;
  high: a safety function is redundantly implemented in two safety relevant logic units; a diagnosis takes place in short cycles, in particular at each sensor cycle, and the diagnoses are compared; or
  very high: a safety function is redundantly implemented in at least three safety relevant logic units; a diagnosis takes place in short cycles, in particular at each sensor cycle, and the diagnoses are compared.

Redundancy is this wholly dispensed with for low and medium safety levels and only the frequency of the tests is adapted or also their complexity. At a high safety level, there is also a two-channel redundancy with a mutual diagnosis; at a very high safety level even a yet higher redundancy. A diversity could furthermore be achieved by assignment to different sub-nodes or computing nodes. This is an exemplary catalogue for a specific use of the presented three adjustable screws, test cycles, redundancy, and diversity for achieving different safety levels. Finer, coarser, and different gradations of the safety levels are conceivable, in particular by different combinations of the respective use of an adjustable screw. A high redundancy and/or diversity can thus, for example, absolutely also be combined with slow test cycles.

At least one logic unit is preferably configured as an automation unit that generates information relevant to automation work and/or a control command for the machine from the sensor data, with the information and the control command not being safety relevant. The runtime environment thus assists a further type of logic unit that provides non-safety relevant additional functions using the sensor data. With such automation work, it is not a question of personal protection or accident avoidance and no safety standards accordingly have to be satisfied to this extent. Typical automation work includes quality and running controls, object recognition for gripping, sorting, or for other processing steps, classifications, and the like. An automation unit also profits from this if the runtime environment assigns it resources flexibly and thereupon monitors whether it still performs its work and, for example, optionally starts the corresponding logic unit again, displaces it to a different computing node, or initiates a copy of the logic unit. It is then, however, a question of availability while avoiding downtimes and supporting proper routines that are absolutely very relevant to the operator of the machine, but have nothing to do with safety.

The at least one sensor is preferably configured as an optoelectronic sensor, in particular a light barrier, light scanner, light grid, laser scanner, FMCW LIDAR, or camera, as an ultrasound sensor, inertial sensor, capacitive sensor, magnetic sensor, inductive sensor, UWB sensor, or as a process parameter sensor, in particular a temperature sensor, throughflow sensor, filling level sensor, or pressure sensor, with the safety device in particular having a plurality of the same or different sensors. These are some examples for sensors that can deliver relevant sensor data for a safety application. The specific selection of the sensor or sensors depends on the respective safety application. The sensors can themselves already be configured as safety sensors. It is, however, explicitly alternatively provided in accordance with the invention to achieve the safety only subsequently by tests, additional sensor systems or (diverse) redundancy, or multi-channel capability, and the like and to combine non-safe sensors of the same or different sensor principles with one another.

The method in accordance with the invention can be further developed in a similar manner and shows similar advantages in so doing. Such advantageous features are described in an exemplary, but not exclusive manner in the subordinate claims dependent on the independent claims.

Figure 2:
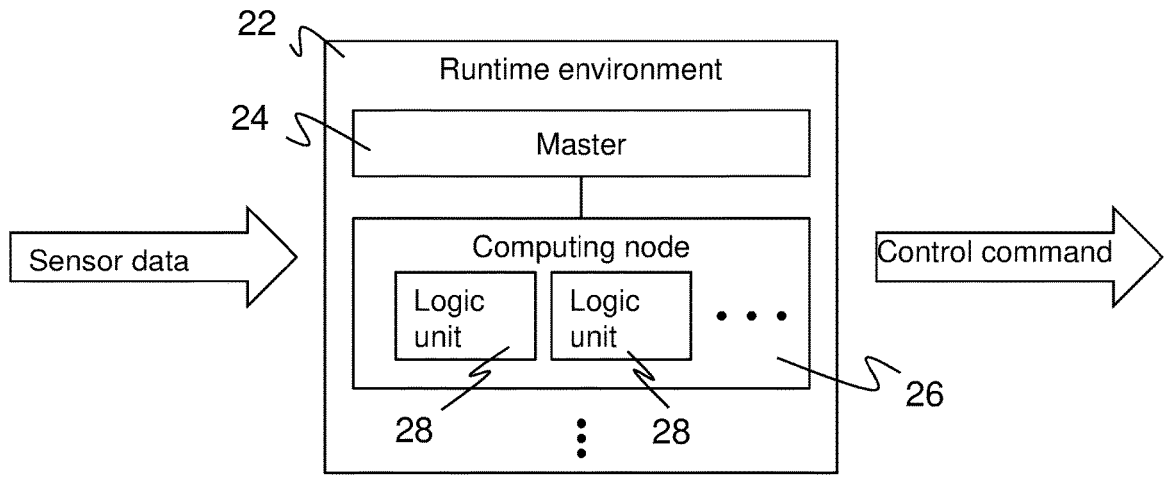
Figure 3:
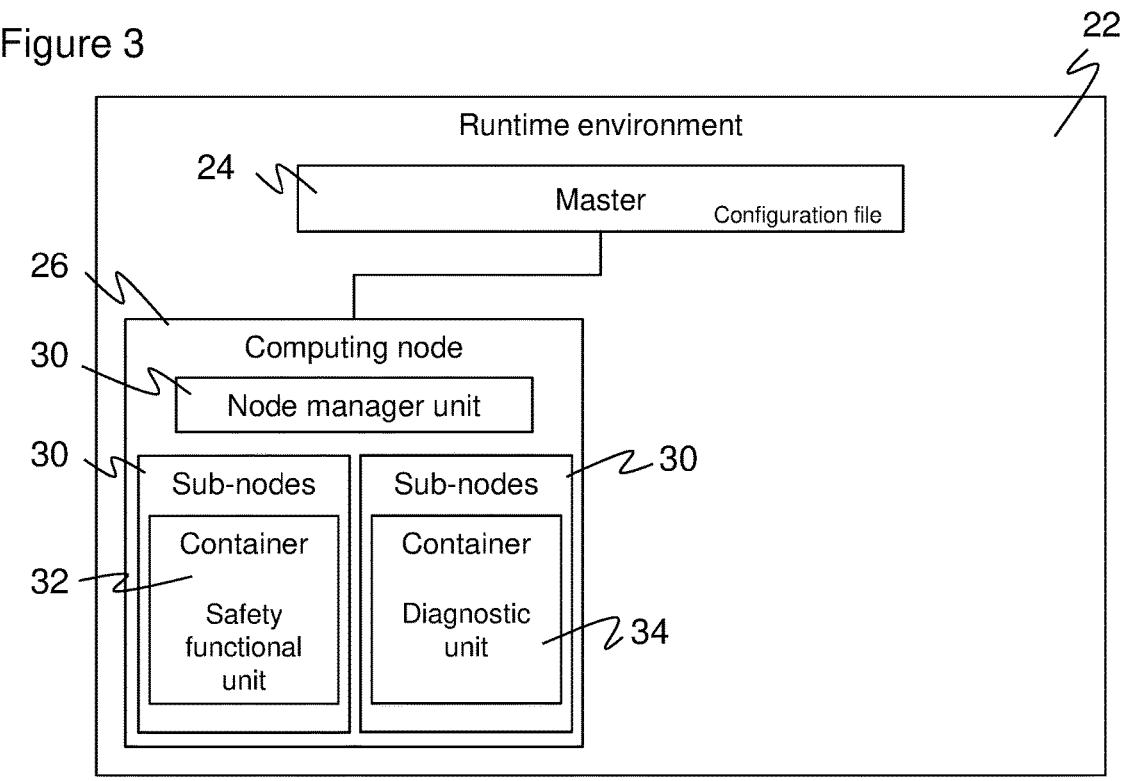
Figure 4:
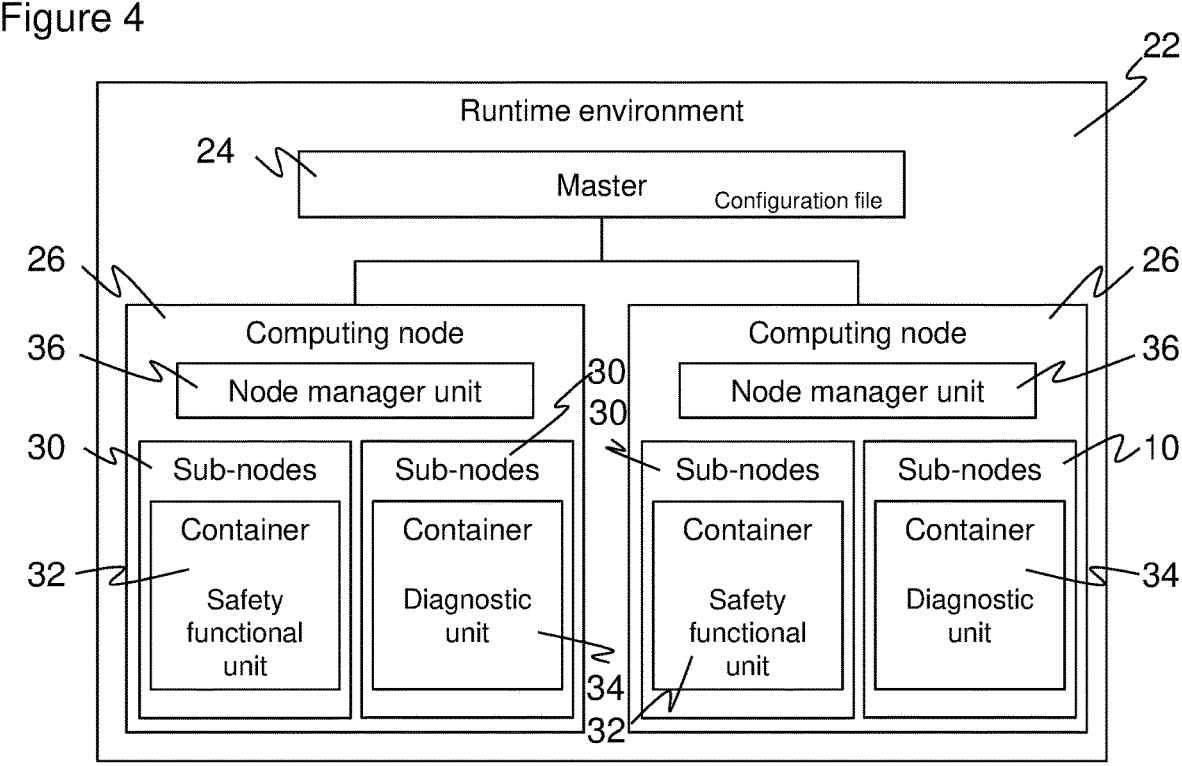

The invention will be explained in more detail in the following also with respect to further features and advantages by way of example with reference to embodiments and to the enclosed drawing. The Figures of the drawing show in:

FIG. 1 an overview illustration of a safety device;

FIG. 2 a schematic representation of a runtime environment of the safety device;

FIG. 3 a schematic representation of a runtime environment in an embodiment with a computing node;

FIG. 4 a schematic representation of a runtime environment similar to

Figure 5:
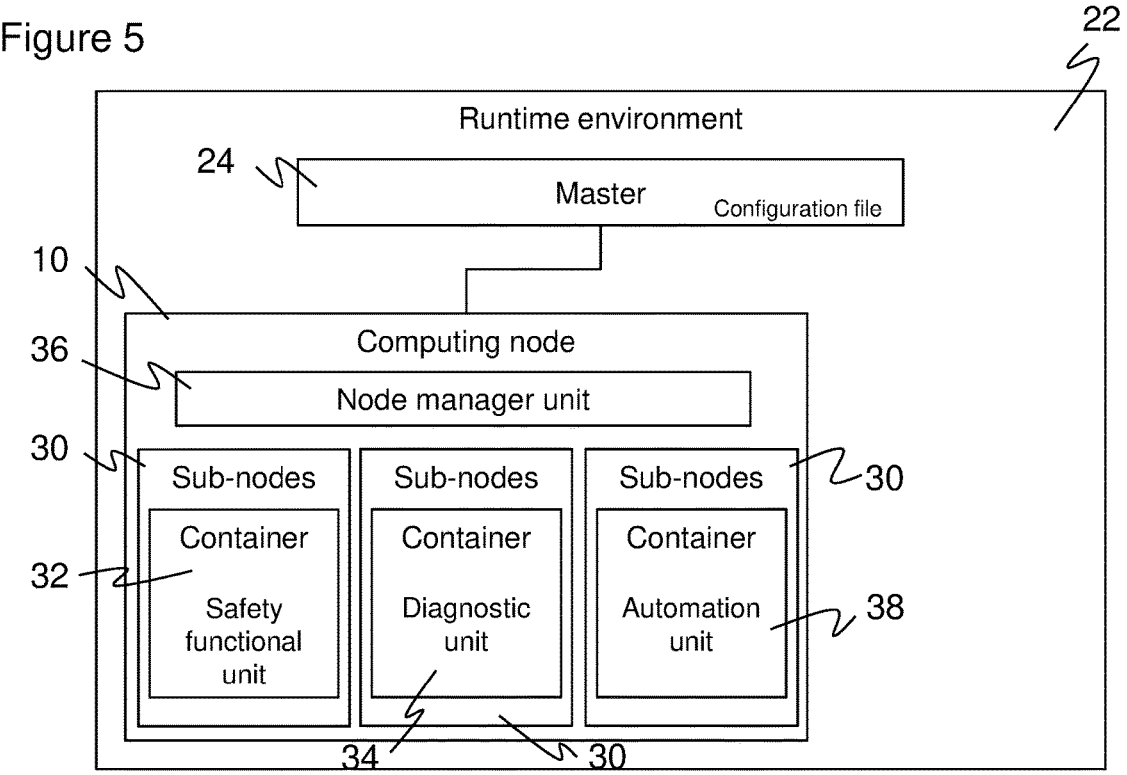

FIG. 3 now with two computing nodes for providing redundancy and diversity;

FIG. 5 a schematic representation of a runtime environment similar to

FIG. 3 with an additional automation unit; and

Figure 6:
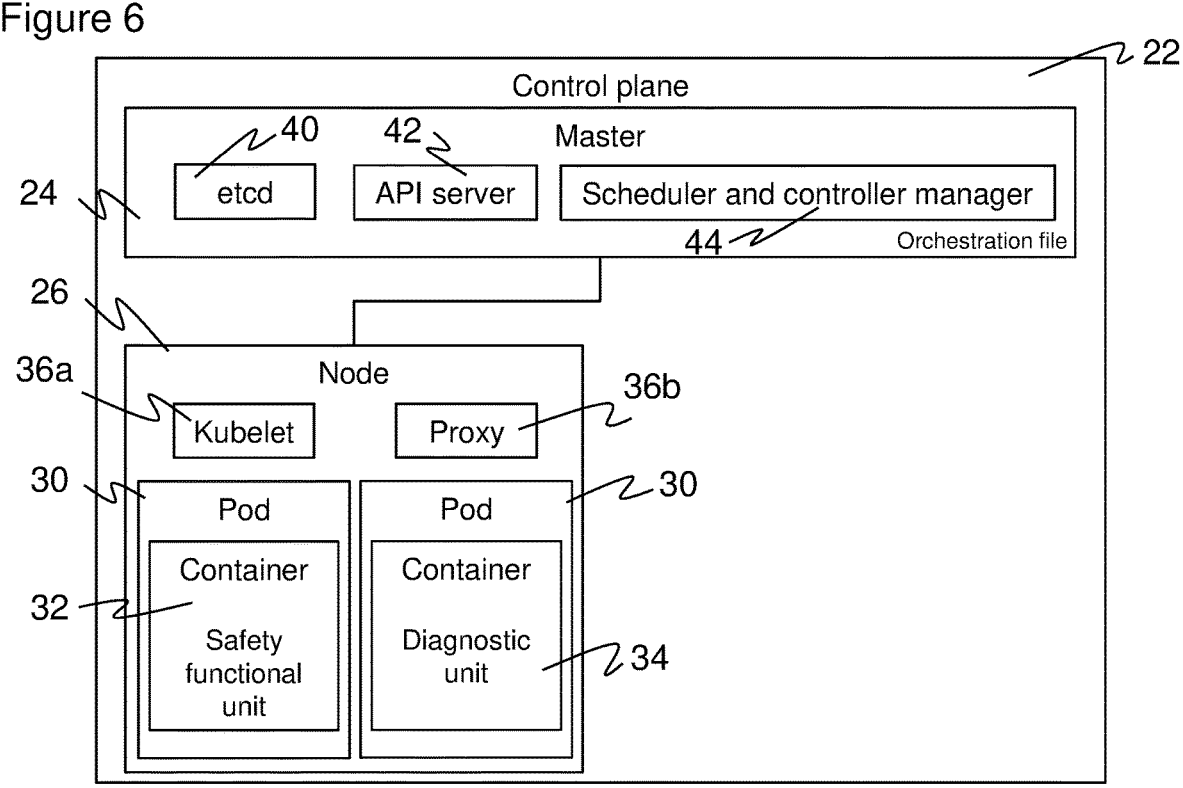

FIG. 6 a schematic representation of a runtime environment similar to FIG. 3 in a special embodiment using Kubernetes.

FIG. 1 shows an overview representation of a safety device 10. The terms safety and safe and unsafe are still to be understood such that corresponding components, transmission paths, and evaluations satisfy or do not satisfy the criteria of safety standards named in the introduction.

The safety device 10 can roughly be divided into three blocks having at least one machine 12 to be monitored, at least one sensor 14 for generating sensor data of the monitored machine 12, and at least one hardware component 16 with computing and memory resources for the control and evaluation functionality for evaluating the sensor data and triggering any safety relevant response of the machine 12. The machine 12, sensor 14, and hardware component 16 are sometimes addressed in the singular and sometimes in the plural in the following, which should explicitly include the respective other embodiments with only one respective unit 12, 14, 16 or a plurality of such units 12, 14, 16.

Respective examples for the three blocks are shown at the margins. The preferably industrially used machine 12 is, for example, a processing machine, a production line, a sorting station, a process plant, a robot, or a vehicle that can be rail-bound or not and is in particular driverless (AGC, automated guided cart; AGV, automated guided vehicle; AMR, autonomous mobile robot).

A laser scanner, a light grid, and a stereo camera as representatives of optoelectronic sensors are shown as exemplary sensors 14 which include further sensors such as laser scanners, light barriers, FMCW LIDAR, or cameras having any 2D or 3D detection such as projection processes or time of flight processes. Some examples for sensors 14 that are still not exclusive are UWB sensors, ultrasound sensors, inertial sensors, capacitive, magnetic, or inductive sensors, or process parameter sensors such as temperature sensors, throughflow sensors, filling level sensors, or pressure sensors. These sensors 14 can be present in any desired number and can be combined with one another in any desired manner depending on the safety device 10.

Conceivable hardware components 16 include controllers (PLCs, programmable logic controllers) a computer in a local network, in particular an edge device or also a cloud, and very generally any hardware that provides resources for digital data processing.

The three blocks are captured again in the interior of FIG. 1. The machine 12 is preferably connected to the safety device 10 via its machine controller 18, with the machine controller being a robot controller in the case of a robot, a vehicle controller in the case of a vehicle, a process controller in a process plant, and similar for other machines 12. The sensors 14 combined in the interior as a block 20 not only generate sensor data, but also have an interface, not shown individually, to output the sensor data in a raw or (pre)processed form and as a rule have their own control and evaluation unit, that is their own separate hardware component for digital data processing.

A runtime environment 22 is a summarizing term for a processing unit that inter alia performs the data processing of the sensor data to acquire control commands to the machine 13 or other safety relevant and further information. The runtime environment 22 is implemented on the hardware components 16 and will be explained in more detail in the following with reference to FIGS. 2 to 6. Which hardware the runtime environment 22 will be executed on is not fixed in accordance with the invention. The above list of possible hardware components names some examples that can be combined as desired. The runtime environment 22 is furthermore intentionally drawn with an overlap to the machine controller 18 and to the block 20 of the sensors 14 since internal computing and memory resources of the sensors 14 and/or of the machine 12 can be also be used by the runtime environment 22, again in any desired combination, including the possibility that there are no additional hardware components 16 at all outside the machine 12 and the sensors 14. It is assumed in the following that the hardware components 16 provide the computing and memory resources so that an inclusion of internal hardware of the machine 12 and/or sensors 14 is then also meant.

The safety device 10 and in particular the runtime environment 22 now provides safety functions and preferably also diagnostic functions. Additional non-safe automation functions will be introduced as a further option later with reference to FIG. 5 delineated from safety functions that can also be called safe automation functions. Such a safety function receives the flow of measurement and event information with the sensor data following one another in time and generates corresponding control signals and preferably also diagnostic or overview information.

The safety device 10 achieves a high availability and robustness with respect to unforeseen internal and external events in that safety functions are performed as a service of the hardware components 16. The flexible composition of the hardware components 16 and preferably their networking in the local or non-local network or in a cloud enable a redundancy and a performance elasticity so that interruptions, disturbances, and demand peaks can be dealt with very robustly. The safety device 10 recognizes as soon as errors can no longer be intercepted and thus become safety relevant and then initiates an appropriate response by which the machine 12 is moved into a safe state as required. For this purpose, the machine 12 is, for example, stopped, slowed down, it evades, or works in a non-hazardous mode. It must again be made clear that there are two classes of events that trigger a safety relevant response: on the one hand, an event that is classified as hazardous and that results from the sensor data, and, on the other hand, the revealing of a safety relevant error.

FIG. 2 shows a schematic representation of the runtime environment 22. It is ultimately the object of the runtime environment 22 to derive a control command from sensor data, in particular a safety signal that triggers a safety relevant response of the machine 12. The runtime environment 22 has a master 24 and at least one computing node 26. The hardware components 26 provide the required computing and memory capacity for the master 24 and computing nodes 26; the runtime environment 22 can extend transparently over a plurality of hardware components 16. A computing node 26 is here to be understood abstractly or virtually; there is not necessarily a 1:1 relationship between a computing node 26 and a hardware component 16, but a hardware component 16 can rather provide a plurality of computing nodes 26 or, conversely, a computing node 26 can be deployed over a plurality of hardware components 16. The deployment applies analogously to the master 24.

A computing node 26 has one or more logic units 28. A logic unit 28 is a functional unit that is closed per se, that accepts information, collates it, transforms it, recasts it, or generally processes it into new information and then makes it available to possible recipients as a control command or for further processing, in particular to further logic units 28 or to a machine controller 12. Three types of logic units 28 must primarily be distinguished within the framework of this description, namely the safety functional units and diagnostic units introduced with respect to FIG. 3 and the automation units introduced with reference to FIG. 5.

The runtime environment 22 activates the respective required logic units 28 and provides for their proper operation. For this purpose, it assigns the required resources on the available computing nodes 26 or hardware components 26 to the respective logic units 28 and monitors the activity and the resource requirement of all the logic units 28. The runtime environment 22 preferably recognizes when a logic unit 28 is no longer active or when interruptions to the runtime environment 22 or the logic unit 28 occurred. It then attempts to reactivate the logic unit 28 and generates a new copy of the logic unit 28 if this is not possible to thus maintain proper operation.

Interruptions can be foreseen or unforeseen. Exemplary causes are errors in the infrastructure, that is in the hardware components 16, their operating system, or the network connections; furthermore accidental incorrect operations or manipulations or the complete consumption of the resources of a hardware component 16. If a logic unit 28 cannot process all the required, in particular safety relevant, information or at least cannot process it fast enough, the runtime environment 22 can prepare additional copies of the respective logic unit 28 to thus further ensure the processing of the information. The runtime environment 22 in this manner provides that the logic unit 28 produces its function at an expected quality and availability.

FIG. 3 again shows a further advantageously fully differentiated embodiment of the runtime environment 22 of the safety device 10. The master 24 forms the management and communication center. Configuration information or a configuration file on the logic units 28 present is stored therein so that the master 24 has the required knowledge of the configuration, in particular which logic units 28 there are and should be, on which computing nodes 26 they can be found, and at which time interval they receive resources and are invoked. The configuration file is preferably secured via signatures against intentional and unintentional manipulations, for example via blockchain technologies. Safety engineering (safety) here advantageously joins forces with the data integrity ((cyber) security) since attacks are repulsed or at least recognized in this manner that could result in unforeseeable accident consequences.

The computing nodes 26 advantageously have their own sub-structure, with the now described units also only being able to be present in part. Initially, computing nodes 26 can again be divided into sub-nodes 30. Logic units 28 are preferably only generated within the sub-nodes 30, not already on the level of computing nodes 26; logic units 28 are preferably virtualized within containers, that is are containerized. Each sub-node 30 therefore has one or more containers, with preferably one logic unit 28 each. There are two logic units 28 in the example of FIG. 3, namely a safety functional unit 32 and a diagnostic unit 24, each in their own container and also sub-nodes 30. Differing from this, it would equally be conceivable to assign the safety functional unit 32 and diagnostic unit 34 to the same sub-node 30.

A node manager unit 36 of the computing node 30 coordinates its sub-nodes 30 and the logic units 28 assigned to this computing node 26. The node manager unit 36 furthermore communicates with the master 24 and with further computing nodes 26. The management work of the runtime environment 22 can be deployed practically as desired on the master 24 and the node manager unit 36; the maser can therefore be considered as implemented in a deployed manner. It is, however, advantageous if the master looks after the global work of the runtime environment 22 and each node manager unit 36 looks after the local work of the respective computing node 26. The master 24 can nevertheless preferably be formed on a plurality of hardware components 16 in a deployed or redundant manner to increase its fail-safeness.

A securing unit or safety functional unit 32 is an example for a special logic unit 28 for evaluating sensor data for securing work with functional safety. Typical examples are distance monitoring systems (specifically speed and separation), passage monitoring, protected field monitoring, or collision avoidance with the aim of an appropriate safety relevant response of the machine 12 in a hazardous case. This is the core task of safety engineering, with the most varied paths being possible of distinguishing between a normal situation and a dangerous one in dependence on the sensor 14 and the evaluation process. Suitable safety functional units 32 can be programmed for every safety application or group of safety applications or can be selected from a pool of existing safety functional units 32.

A diagnostic unit 34 is a further example for a special logic unit 28 and is likewise safety relevant. The diagnostic unit 34 can be simple, for instance as a watchdog or can carry out tests and diagnoses of different complexity. As a logic unit 28, it runs in the same runtime environment 22 and is operated according to its same basic principles, just like a safety functional unit 32. It is able to replace safe algorithms and self-monitoring measures of a safety functional unit 32 at least in part or to complement them. For this purpose, however, the diagnostic unit 34 monitors the activities of the functional safety unit 22 for their correctness in an analyzed manner, i.e. whether this functional safety unit 32 carries out the activities intended for it in the fixed order and in the temporal conditions. The runtime environment 22 therefore only checks whether a functional safety unit 32 is still active at all; the diagnostic unit 34 in contrast specifically checks whether orders, time widows, points in time, and contents of the activities are correct and thus reveals errors of the safety functional unit 32. For this purpose, the diagnostic unit 34 has expectations for the output of the safety functional unit 32 at specific times, either in its regular operation or in response to specific artificial information fed in as a test.

It becomes possible by the use of the runtime environment 22 to deploy safety relevant logic units 28 in practically any desired manner over an environment, also a very heterogeneous environment, of the hardware components 26, including an edge network or a cloud. The runtime environment 22 initiates the required logic units 28, ends them or displaces them between the computing nodes 26 and the sub-nodes 30.

FIG. 4 shows a further embodiment of the runtime environment 22 of the safety device 10. Complementing the embodiment in accordance with FIG. 3, copies of the safety functional unit 32 and of the diagnostic unit 24 are produced here. A further computing node 26 is also present in this example for this purpose, but this would not be compulsory since further logic units could also be applied in the same computing node 26 or even in sub-nodes 30. The additional logic units 28 are not provided for additional functionality even though this would also be conceivable, but rather to generate redundancies. A diagnostic unit 34 can in this respect be respectively associated with a safety functional unit 32 of the same or of a different computing node 26, equally to the same or to a different sub-node 30. In addition, a diagnostic unit 34 can alternatively monitor a safety functional unit 32 one-to-one, or a diagnostic unit 34 is responsible for a plurality of safety functional units 32 or, conversely, a plurality of diagnostic units 34 are responsible for the same safety functional unit 32. A plurality of diagnostic units 34 can additionally preferably compare their diagnoses with one another.

The invention thus makes possible a scaling of the safety level (for instance performance class PC in accordance with IEC/TS 62998, performance level in accordance with ISO 13849, or safety integrity level, SIL, in accordance with IEC 61508) via an adaptation to a heterogeneous environment with almost any desired hardware components 16. There are three adjustable screws for this purpose: The frequency of the diagnosis, that is the test cycles by which a diagnostic unit 34 monitors a safety functional unit 32, the multiplicity of the redundancy, that is how many copies of a safety functional unit 32 and/or diagnostic unit 34 are active and the diversity, that is on how many computing nodes 26 or sub-nodes 30 the safety functional unit 32 and diagnostic units 34 are deployed.

The following gradation of the safety level could be achieved by way of example:

Low safety level: a safety functional unit 32 and a diagnostic unit 34 are each instanced only once and run on the same hardware component 16, in particular on a single computer, and the diagnostic unit 34 checks the processing results of the safety functional unit 32 only in every nth sensor cycle by which the sensors 14 provide sensor data or in which they are processed. The runtime environment 22 for this purpose in particular carries out the safety functional unit 32 n times and only then the diagnostic unit 34. This procedure is similar to a so-called test before demand.

Medium safety level: there is still only one respective copy of the safety functional unit 32 and of the diagnostic unit 34. However, the frequency of the diagnosis is increased up to a check of every sensor cycle, where then the runtime environment invokes the diagnostic unit 34 every time after the safety functional unit 32.

High safety level: two respective instances of the safety functional unit 32 and of the diagnostic unit 34 are now generated by the runtime environment that are assigned to different sub-nodes 30 or even better computing nodes 26, and preferably thus also hardware modules 16. This produces a twofold redundancy and thus a two-channel system and simultaneously a possible diversity. The diagnostic units 34 have short test cycles, preferably the same cycle as the safety functional units 32. It is conceivable to carry out or to frequently intersperse cross-testing in which a diagnostic unit 34 monitors a different copy of the safety functional unit 32 or to compare the diagnoses of the diagnostic units 34 with one another.

Very high safety level :now, even more than two copies of the safety functional unit 42 and/or of the diagnostic unit 34 are generated. Depending on the specific embodiment, an at least three-channel system or generally a k-fold redundancy or diverse redundancy is thus produced. Otherwise, the same statements on the high safety level: also apply here.

The corresponding demands are communicated in the configuration file or are held there. This can take place directly from the outside to set a specific safety level by hand or on a separate demand. A situational adaptation of the safety level is particularly advantageous. In this respect, the safety device 10 determines, in particular by means of a suitable safety functional unit 32, how the current hazard position is to be evaluated with reference to the sensor data and optionally to further information, in particular from the machine controller 18, for example on a forthcoming work-step. This situational or context-related risk estimate is called a "behavior driven risk assessment". There can be special events that have an influence on an appropriate safety level such as the special demand of a safety function, the closing of a job, or a maintenance demand. The runtime environment can then respectively set, even dynamically set, the new safety level via the described adaptations and can, where necessary, initiate logic units 28, end them, or displace them between computing nodes 26 or sub-nodes 30. An optimization using conditions such as an increased process efficiency or production efficiency is also conceivable.

The latter in particular applies when the runtime environment is not solely responsible for safety, but rather also uses the sensors 14 for non-safety relevant automation work. FIG. 5 shows a corresponding embodiment of the runtime environment 22. A further logic unit 26 is added there, namely an automation unit 38. In this respect, individual or several automation units 38 having any desired embodiments, in particular as explained with reference to FIGS. 3 and 4, can be combined; FIG. 5 only shows a simple example respectively having a computing node 26, a safety functional unit 32, a diagnostic unit 34, and an automation unit 38.

An automation unit 38 is a logic unit 28 that monitors sensors 14 and machines 12 or parts thereof, generally actuators, and that controls (partial) routines on the basis of this information or provides information thereon. An automation unit 38 is in principle treated by the runtime environment like every logic unit 23 and is thus preferably likewise containerized. Examples for automation work include a quality check, variant control, object recognition for gripping, sorting, or for other processing steps, classifications, and the like. The delineation from the safety relevant logic units 28 consist of an automation unit 38 not contributing to accident prevention, i.e. to the safety relevant application. It accordingly also does not require any diagnostic unit 34. A reliable working and a certain monitoring by the runtime environment 22 is nevertheless desired, but this serves an increase of the availability and thus of the productivity and quality, but not safety.

The architecture of the runtime environment 22 permits a seamless merging of safety and automation since safety relevant logic units 32, 34 and automation units 38 can be performed in the same environment and practically simultaneously and can be treated in the same manner. In the event of a conflict, the runtime environment 22 preferably gives priority to the safety relevant logic units 32, 34, for instance in the event of scarce resources. Performance rules for the coexistence of safety relevant logic units 32, 34 and automation units 38 can be taken into account in the configuration file.

FIG. 6 shows a schematic representation of a runtime environment 22 in an embodiment using Kubernetes. The runtime environment 22 is called a control plane here. FIG. 6 is based on FIG. 3; the further embodiments explained with reference to FIGS. 3 to 5 can be implemented analogously in Kubernetes. The master 24 has a sub-structure in Kubernetes. The (Kubernetes) master 24 is still not itself responsible for the execution of containers or logic units 28, but rather takes care of the general routines or the orchestration (orchestration layer). The configuration file is accordingly called an orchestration file. A database etcd 40 for all the relevant data of the Kubernetes environment, an API server 24 as an interface to Kubernetes, and a schedule and controller manager 44 that carries out the actual orchestration are furthermore present.

The hardware present is divided into nodes as computing nodes 26. There are in turn one or more so-called pods as sub-nodes 30 in the nodes and the container having the actual micro-services are therein, in this case the logic units 20 together with the associated container runtime and thus all the libraries and dependences required for the logic unit 28 on the runtime. The local management performs a node manager unit 38 now divided into two with a so-called Kubelet 36a and a proxy 36b. The Kubelet 36a is an agent that manages the separate pods and containers of the nodes. The proxy 36b in turn includes the network rules for the communication between the nodes and with the master.

Kubernetes is a preferred, but by no means the only implementation option for the runtime environment 22. Docker swarm could be named as one further alternative among many. Docker itself is not a direct alternative, but rather a tool for producing containers and thus combinable with Kubernetes and Docker swarm that then orchestrate the containers.

The invention claimed is:

1. A safety device for monitoring at least one machine, the safety device comprising:
   at least one sensor for generating sensor data on the at least one machine; and
   processing unit for receiving the sensor data, the processing unit being connected at least indirectly to the at least one sensor and to the at least one machine, wherein the processing unit is configured as a runtime environment having at least one computing node and is further configured to allow a plurality of logic units to run on the at least one computing node,
   wherein at least one of the logic units comprises a safety functional unit for a safety relevant evaluation of the sensor data to output a safety signal when the safety functional unit determines there is a safety relevant event, safety signal being output to the at least one machine for triggering a safety response, the safety relevant event being associated with physical safety at or in a physical environment around the at least one machine, and
   wherein the processing unit is further configured to dynamically generate copies of one or more of the logic units, resolve issues affecting the logic units and/or to assign one or more of the logic units to the at least one computing node;
   wherein the runtime environment has at least one master unit that communicates with the at least one computing node and coordinates them;
   wherein the runtime environment is configured to test whether at least one of the logic units is still working and/or to change resources assigned to the at least one of the logic units.

2. The safety device in accordance with claim 1, wherein at least one of the plurality of logic units is configured as a diagnostic unit that tests or monitors the safety functional unit.

3. The safety device in accordance with claim 1, wherein the runtime environment keeps configuration information on the logic units stored.

4. The safety device in accordance with claim 3, wherein the configuration information is secured against manipulation by means of signatures or blockchain datasets.

5. The safety device in accordance with claim 1, wherein the at least one computing node has a node manager unit for communication with other computing nodes and with the runtime environment.

6. The safety device in accordance with claim 1, wherein the at least one computing node has at least one sub-node and the logic units are associated with a sub-node.

7. The safety device in accordance with claim 1, wherein the at least one logic unit is implemented as a container.

8. The safety device in accordance with claim 1, wherein the runtime environment is implemented on the at least one sensor, on a programmable logic controller, on a machine controller, on a computer device in a local network, on an edge device and/or in a cloud.

9. The safety device in accordance with claim 1,
wherein the runtime environment is configured to integrate and/or to preclude the at least one computing node.

10. The safety device in accordance with claim 1,
wherein the runtime environment is configured to dynamically generate and resolve an issue affecting a safety relevant logic unit in the runtime environment and/or to assign the safety relevant logic unit to the at least one computing node.

11. The safety device in accordance with claim 1,
wherein the safety functional unit is configured to dynamically determine a required or achievable safety level for the safety device.

12. The safety device in accordance with claim 1,
wherein the runtime environment is configured to dynamically adapt a safety level of the safety device by at least one of: changing test cycles, changing redundancy, and/or changing diversity, changing a number of the logic units responsible for the performance of a safety function, and/or changing sub-nodes or the at least one computing node on which one of the logic units responsible for a safety function is implemented.

13. The safety device in accordance with claim 12,
wherein the runtime environment is configured to dynamically adapt the safety level of the safety device by changing points in time at which a diagnostic unit tests or monitors the safety functional unit.

14. The safety device in accordance with claim 1,
wherein the runtime environment is configured to set a safety level of the safety device to:
a level of low when a safety function is only implemented in a safety relevant logic unit and a diagnosis only takes place at every nth sensor cycle or before demand;
a level of medium when the safety function is only implemented in a safety relevant logic unit and a diagnosis takes place in short cycles;
a level of high when the safety function is redundantly implemented in two safety relevant logic units and a diagnosis takes place in short cycles and the diagnoses are compared; or
a level of very high when the safety function is redundantly implemented in at least three safety relevant logic units; and a diagnosis takes place in short cycles and the diagnoses are compared.

15. The safety device in accordance with claim 14,
wherein, when the diagnosis takes place in short cycles, the diagnosis takes place at every sensor cycle.

16. The safety device in accordance with claim 1,
wherein at least one of the logic units is configured as an automation unit that generates information relevant to automation work and/or a control command for the at least one machine from the sensor data, with the information and the control command not being safety relevant.

17. The safety device in accordance with claim 1,
wherein the at least one sensor is configured as an optoelectronic sensor, or as an ultrasound sensor, an inertial sensor, a capacitive sensor, a magnetic sensor, an inductive sensor, a UWB sensor, or as a process parameter sensor.

18. The safety device in accordance with claim 17,
wherein the optoelectronic sensor is one of a light barrier, a light scanner, a light grid, a laser scanner, a FMCW LIDAR, or a camera.

19. The safety device in accordance with claim 17,
wherein the process parameter sensor is one of a temperature sensor, a throughflow sensor, a filling level sensor, or a pressure sensor.

20. The safety device in accordance with claim 17,
wherein the safety device has a plurality of the same or different sensors.

21. A safety method for monitoring at least one machine, comprising:
at least one sensor generating sensor data on the at least one machine;
a processing unit receiving the sensor data, the processing unit being connected at least indirectly to the at least one sensor and to the at least one machine, the processing unit establishing a runtime environment and having at least one computing node;
a plurality of logic units running on the at least one computing node;
at least one of the logic units operating as a safety functional unit and evaluating the sensor data in a safety relevant manner;
the at least one of the logic units outputting a safety signal to the at least one machine when the safety functional unit determines there is safety relevant event, the safety signal triggering a safety response in the at least one machine, the safety relevant event being associated with physical safety at or in a physical environment around the at least one machine;
and the processing unit dynamically generating copies of one or more of the logic units, resolving issues affecting the logic units and/or assigning one or more of the logic units to the at least one computing node;
wherein the runtime environment has at least one master unit that communicates with the at least one computing node and coordinates them;
wherein the runtime environment is configured to test whether at least one of the logic units is still working and/or to change resources assigned to the at least one of the logic units.

* * * * *